US008017217B1

(12) United States Patent
Gregoire et al.

(10) Patent No.: US 8,017,217 B1
(45) Date of Patent: Sep. 13, 2011

(54) VARIABLE EMISSIVITY MATERIAL

(75) Inventors: Daniel J. Gregoire, Thousand Oaks, CA (US); Deborah J. Kirby, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 109 days.

(21) Appl. No.: 12/118,493

(22) Filed: May 9, 2008

(51) Int. Cl.
*B32B 3/24* (2006.01)
*G01F 1/29* (2006.01)
*H01Q 17/00* (2006.01)

(52) U.S. Cl. ........ 428/137; 428/131; 428/138; 428/220; 428/457; 428/913; 428/919; 428/596; 359/577; 359/578; 359/580; 359/582; 359/585; 250/505.1; 250/515.1; 250/519.1; 342/1; 342/2; 342/3; 342/4; 342/6

(58) Field of Classification Search ........................ None
See application file for complete search history.

(56) References Cited

U.S. PATENT DOCUMENTS

| | | | | |
|---|---|---|---|---|
| 2,992,426 | A * | 7/1961 | Borcherdt | 428/46 |
| 3,174,537 | A * | 3/1965 | Meyer | 165/42 |
| 3,540,047 | A * | 11/1970 | Hach et al. | 342/1 |
| 3,733,606 | A * | 5/1973 | Johansson | 342/3 |
| 4,038,660 | A * | 7/1977 | Connolly et al. | 342/1 |
| 4,131,593 | A | 12/1978 | Mar | |
| 4,462,883 | A | 7/1984 | Hart | |
| 4,640,851 | A * | 2/1987 | Pusch | 428/17 |
| 4,863,245 | A * | 9/1989 | Roxlo | 359/276 |
| 4,987,418 | A * | 1/1991 | Kosowsky et al. | 342/6 |
| 5,081,455 | A * | 1/1992 | Inui et al. | 342/1 |
| 5,103,103 | A * | 4/1992 | Radford et al. | 250/515.1 |
| 5,214,432 | A * | 5/1993 | Kasevich et al. | 342/3 |
| 5,274,241 | A * | 12/1993 | Radford et al. | 250/515.1 |
| 5,385,623 | A * | 1/1995 | Diaz | 156/197 |
| 5,627,541 | A * | 5/1997 | Haley et al. | 342/1 |
| 5,976,666 | A * | 11/1999 | Narang et al. | 428/138 |
| 6,225,939 | B1 * | 5/2001 | Lind | 342/4 |
| 6,335,699 | B1 * | 1/2002 | Honma | 342/4 |
| 6,549,114 | B2 * | 4/2003 | Whitney et al. | 338/21 |
| 6,753,075 | B1 * | 6/2004 | Leupolz et al. | 428/323 |
| 6,897,820 | B2 * | 5/2005 | Frenkel | 343/756 |
| 6,974,629 | B1 | 12/2005 | Krisko | |
| 7,903,040 | B2 * | 3/2011 | Gevorgian et al. | 343/787 |
| 2002/0037421 | A1 * | 3/2002 | Arnaud et al. | 428/472 |
| 2002/0080089 | A1 * | 6/2002 | Bergstedt et al. | 343/909 |
| 2006/0012508 | A1 * | 1/2006 | Messano | 342/1 |
| 2008/0192331 | A1 * | 8/2008 | Wang et al. | 359/315 |

* cited by examiner

*Primary Examiner* — Patricia L Nordmeyer
*Assistant Examiner* — Jeff A Vonch
(74) *Attorney, Agent, or Firm* — Ladas & Parry

(57) ABSTRACT

A material of variable emissivity includes a first metallic layer having a first aperture, a second metallic layer having a second aperture, and a variable dielectric layer interposed between the first metallic layer and the second metallic layer.

21 Claims, 5 Drawing Sheets

VARIABLE EMISSIVITY MATERIAL

TECHNICAL FIELD

This disclosure relates to the emissivity of materials, and in particular to materials having a variable emissivity.

BACKGROUND

Various coatings for controlling the emissivity of a surface have been described. U.S. Pat. No. 4,131,593 to Mar et al. describes a low infrared emissivity paint, which can be utilized as a protective medium against the harmful effects of a nuclear explosion. U.S. Pat. No. 4,462,883 to Hart describes a low emissivity coating on a transparent substrate of glass or plastic. U.S. Pat. No. 6,974,629 to Krisko et al. describes a low emissivity, soil resistant coating for glass surfaces.

These U.S. Patents describe how to lower the emissivity of a surface. However, they do not describe how to dynamically vary the emissivity, so that, for example, a material or surface has a relatively high emissivity at one time and has a relatively low emissivity at another time.

What is needed is a material for which the emissivity can be controlled to dynamically vary. Also needed is a way of controlling the operational wavelengths over which the emissivity of the material can be controlled, including the infrared wavelengths. The embodiments of the present disclosure answer these and other needs.

SUMMARY

In a first embodiment disclosed herein, a material includes a first metallic layer having a first aperture, a second metallic layer having a second aperture, and a variable dielectric layer interposed between the first metallic layer and the second metallic layer.

In another embodiment disclosed herein, a method for manufacturing a variable emissivity material includes selecting a first metallic layer having a first aperture, selecting a second metallic layer having a second aperture, and joining the first and second metallic layers to a variable dielectric layer interposed between the first metallic layer and the second metallic layer.

In another embodiment disclosed herein, a method for creating a variable emissivity material includes selecting a first metallic layer having a first aperture, selecting a second metallic layer having a second aperture, joining the first and second metallic layers to a variable dielectric layer interposed between the first metallic layer and the second metallic layer, and applying an electric field between the first metallic layer and the second metallic layer.

In another embodiment disclosed herein, a method for creating a variable emissivity material includes selecting a first metallic layer having a first aperture, selecting a second metallic layer having a second aperture, joining the first and second metallic layers to a variable dielectric layer interposed between the first metallic layer and the second metallic layer and providing a temperature change in the range of about 50 to 100 degrees centigrade to the variable dielectric layer.

These and other features and advantages will become further apparent from the detailed description and accompanying figures that follow. In the figures and description, numerals indicate the various features, like numerals referring to like features throughout both the drawings and the description.

DETAILED DESCRIPTION

Figure 1:
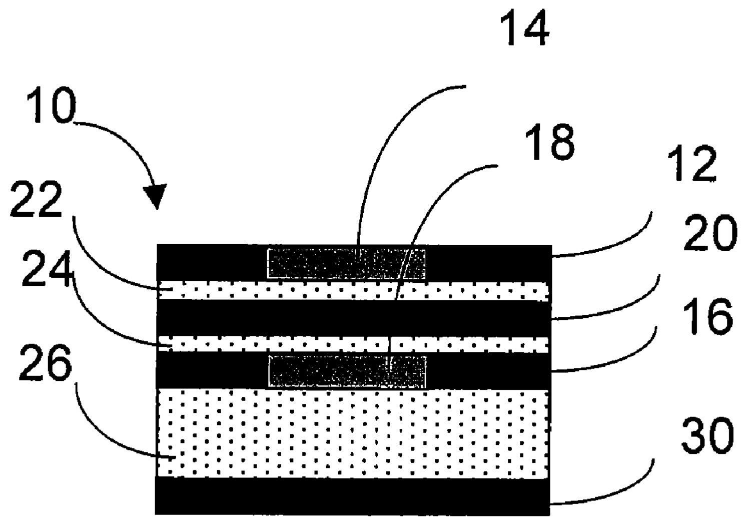
FIG. 1 is an elevation sectional view of a variable emissivity material in accordance with the present disclosure.
Figure 2:
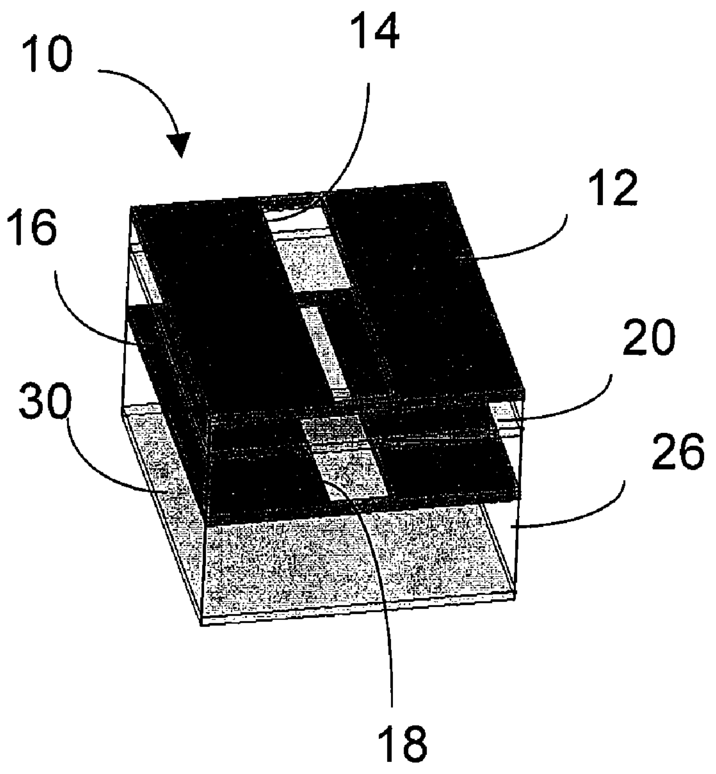
FIG. 2 is a perspective view of a variable emissivity material in accordance with the present disclosure.

Referring to FIG. 1, an elevation sectional view is shown for a portion of one embodiment of a variable emissivity material 10 in accordance with the present disclosure. The top layer of the material 10 is a first metallic layer 12 that may have one or more resonant apertures 14. The resonant apertures can be arranged in a periodic array. FIG. 1 shows an embodiment of a variable emissivity material 10 with one aperture and FIG. 2 shows a perspective view of the same embodiment. A second metallic layer 16 is below first metallic layer 12 and may have one or more resonant apertures 18. In between the first metallic layer 12 and the second metallic layer 16 is a variable dielectric layer 20.

The variable dielectric layer 20 can be selected from the family of ferroelectric materials, and one such ferroelectric material is vanadium oxide. The internal electric dipoles of a ferroelectric material are physically tied to the ferroelectric material lattice so that anything that changes the physical lattice will change the strength of the dipoles and change the conductivity of the ferroelectric material. Two stimuli that will change the lattice dimensions and hence the conductivity of a ferroelectric material are voltage and temperature. Voltage creates an electric field that affect the dipoles.

The variable dielectric layer 20 is separated from the first and second metallic layers 12 and 16 by first dielectric layer 22 and second dielectric layer 24, respectively. First dielectric layer 22 and second dielectric layer 24 are specifically not made of ferroelectric materials, but rather are nearly inert dielectric materials that have low permittivity. In contrast, the variable dielectric layer 20 has a variable permittivity, such that in the activated state the variable dielectric layer 20 has a high permittivity compared to the first dielectric layer 22 and second dielectric layer 24. In the deactivated state the permittivity of the variable dielectric layer 20 changes to a lower permittivity compared to the high permittivity of the activated state.

Also in the activated state the variable dielectric layer 20 is more conductive than in the deactivated state. Thus, in the activated state the variable dielectric layer 20 has conductive properties similar to a metallic layer, and therefore more incident radiation is reflected from the variable dielectric layer 20, which results in the variable emissivity material 10 having a low emissivity. In the deactivated state the variable dielectric layer 20 is less conductive and therefore less incident radiation is reflected from the variable dielectric layer 20. Thus, in the deactivated state the variable emissivity material 10 has a relatively high emissivity.

Below the second metallic layer 16 is a third dielectric layer 26 and below the third dielectric layer 26 is a third metallic layer 30, which is provided to act as a ground plane. The third dielectric layer 26 is similar in material composition to first dielectric layer 22 and second dielectric layer 24 and is also a nearly inert dielectric with low permittivity.

In one embodiment, first and second metallic layers 12 and 16 may be about 100 nm thick, first and second dielectric layers 22 and 24 may be each about 200 nm thick, third dielectric layer 26 may be about 400 nm thick, and variable dielectric layer 20 may be about 100 nm thick. The resulting material is therefore very thin and can be manufactured as a film, which can then be applied to a surface.

The emissivity of a material is defined as the ratio of energy radiated by the material to energy radiated by a black body at the same temperature. It is a measure of a material's ability to absorb incident radiation and radiate energy. For an object in thermal equilibrium, emissivity equals absorptivity. Thus, an object that absorbs less incident radiation will also emit less radiation than an ideal black body. A true black body has an emissivity equal to 1 while any real object has an emissivity less than 1, because a black body is an object that absorbs all incident radiation, including light that falls on it. Because no light is reflected or transmitted, the object appears black when it is at zero degrees Kelvin. Because a real object reflects some light, a high reflected power from a material indicates a low emissivity, while a low reflected power from a material indicates a higher emissivity.

The variable dielectric layer 20 of the variable emissivity material 10 can be activated to cause the material to evince a comparatively lower emissivity by applying a voltage across the first and second metallic layers 12 and 16. In one nonlimiting example, variable dielectric layer 20 can be activated by applying a voltage in the range of 5 to 100 volts across the first metallic layer 12 and the second metallic layer 16. Alternatively, in another nonlimiting example, the variable dielectric layer 20 can be activated by a causing a temperature change to the variable dielectric layer 20 in the range of 50 to 100 degrees centigrade. As discussed above, in the activated state the variable dielectric layer 20 is more conductive than in the deactivated state. Thus, in the activated state the variable dielectric layer 20 has conductive properties similar to a metallic layer, and therefore more incident radiation is reflected from the variable dielectric layer 20, which results in the variable emissivity material 10 having a low emissivity. In the deactivated state the variable dielectric layer 20 is less conductive and therefore less incident radiation is reflected from the variable dielectric layer 20. Thus, in the deactivated state the variable emissivity material 10 has a relatively high emissivity.

Figure 3A:
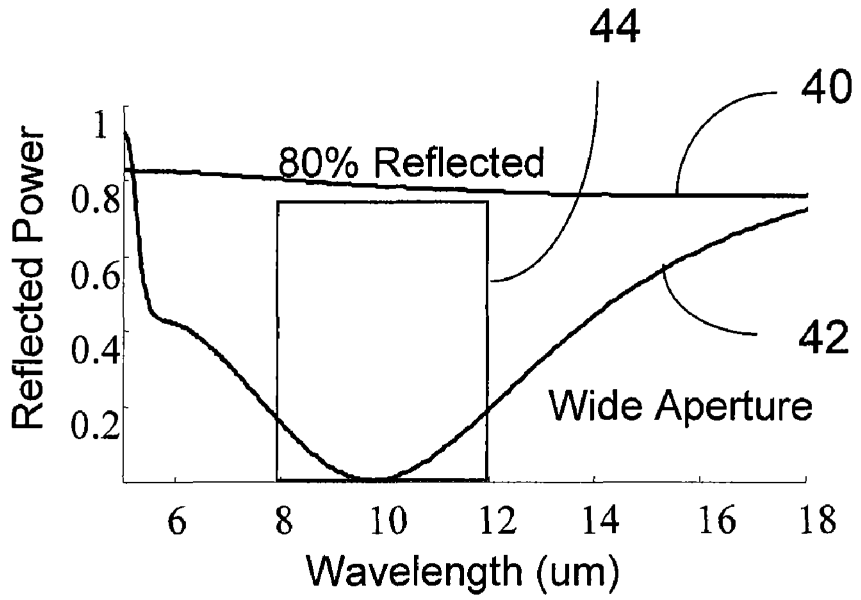
FIG. 3A is a graph showing the reflected power of a variable emissivity material as disclosed herein for a relatively wide aperture in an activated and deactivated state in accordance with the present disclosure.
Figure 3B:
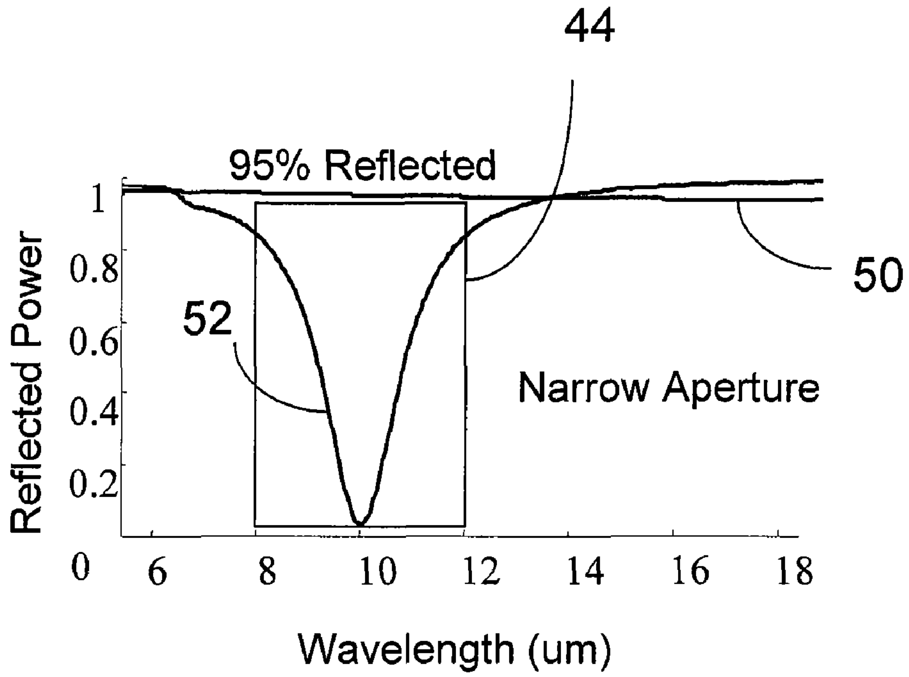
FIG. 3B is a graph showing the reflected power of a variable emissivity material as disclosed herein for a relatively narrow aperture in an activated and deactivated state in accordance with the present disclosure.

The wavelengths for which the emissivity of the material can be controlled, which are referred to herein as the operational wavelengths, depend on the spacing of the apertures in the array and on the width of the apertures, as well as other factors. FIG. 3A shows the reflected power of the variable emissivity material 10 for radiation having wavelengths of 8 to 12 microns incident on the first metal layer 12, in an embodiment where the apertures on first and second layers 12 and 16 are relatively wide. FIG. 3B shows the reflected power of the variable emissivity material 10 for radiation having wavelengths of 8 to 12 microns incident on the first metal layer 12, when the apertures on first and second layers 12 and 16 are relatively narrow.

As shown in FIG. 3A, in the activated state 40, a relatively wide aperture reflects about 0.8 of the incident radiation. This indicates a low emissivity for the variable emissivity material 10. In the deactivated state 42 the reflected power varies across the desired bandwidth 44 and approaches zero reflected power at 10 microns wavelength. Thus, at that wavelength the incident radiation is absorbed by the variable emissivity material 10, which indicates a high emissivity for the variable emissivity material 10.

As shown in FIG. 3B, in the activated state 50, a relatively narrow aperture reflects about 0.95 of the incident radiation. This indicates a low emissivity for the variable emissivity material 10. In the deactivated state 52 the reflected power varies across the desired bandwidth 44 and approaches zero reflected power at 10 microns wavelength. Thus, at that wavelength the incident radiation is absorbed by the variable emissivity material 10, which indicates a high emissivity for the variable emissivity material 10.

The operational wavelength range of the material is wider for a relatively wide aperture, because in the deactivated state the reflected power is lower and the emissivity higher over a wider range of bandwidths; however, the difference in the reflected power or the difference in the emissivity of the variable emissivity material 10 between the activated and deactivated states is greater for the relatively narrower aperture. The selection of aperture width is therefore a tradeoff and depends on the application for the variable emissivity material.

Figure 4:
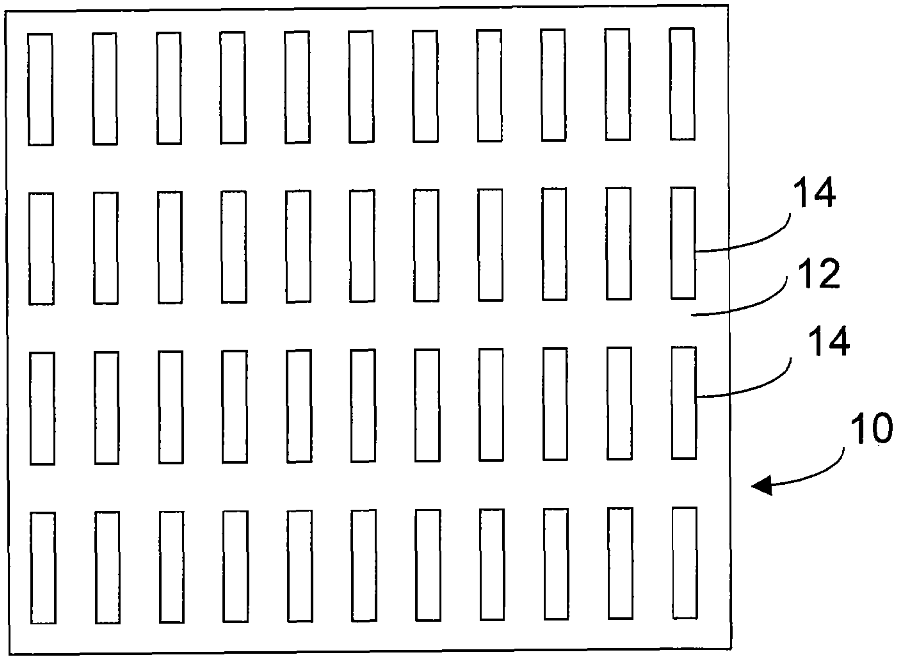
FIG. 4 is a top view of a variable emissivity material as disclosed herein showing an array of rectangular resonant apertures on the first metal layer in accordance with the present disclosure.
Figure 5:
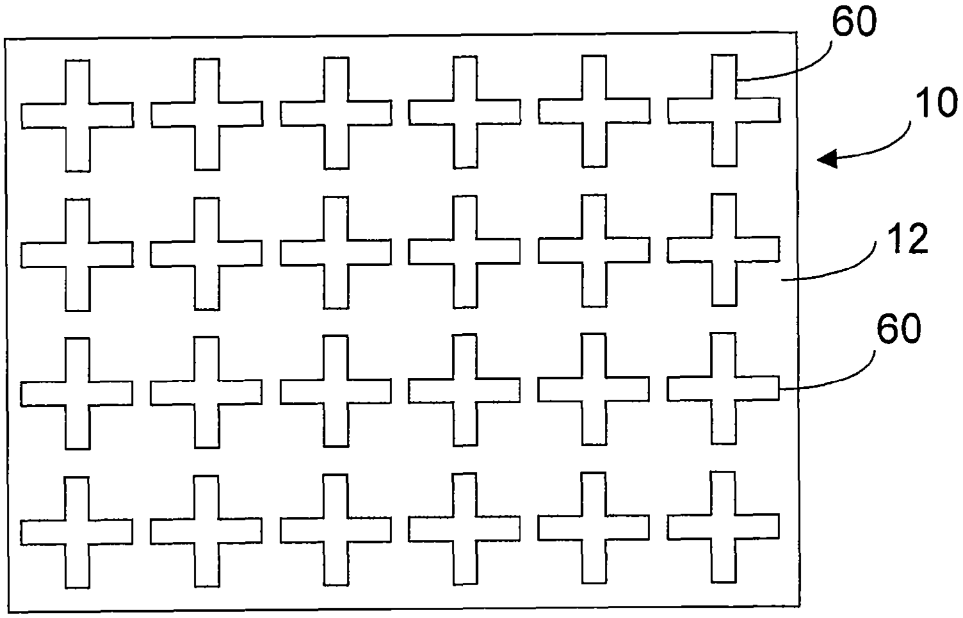
FIG. 5 is a top view of a variable emissivity material as disclosed herein showing an array of resonant apertures in the shape of crosses on the first metal layer in accordance with the present disclosure.

There are many shapes of apertures that can be used in the first and second metallic layers 12 and 16. FIG. 4 is a top view of the variable emissivity material 10 showing an array of rectangular apertures 14. With this shape of aperture the emissivity of the variable emissivity material 10 is polarization dependent. The emissivity of the variable emissivity material 10 will only be responsive to incident radiation with polarization parallel to the rectangular aperture's short axis. Another shape of aperture is shown in FIG. 5, which has apertures in the shape of crosses 60. This shape of aperture is polarization independent.

Figure 6:
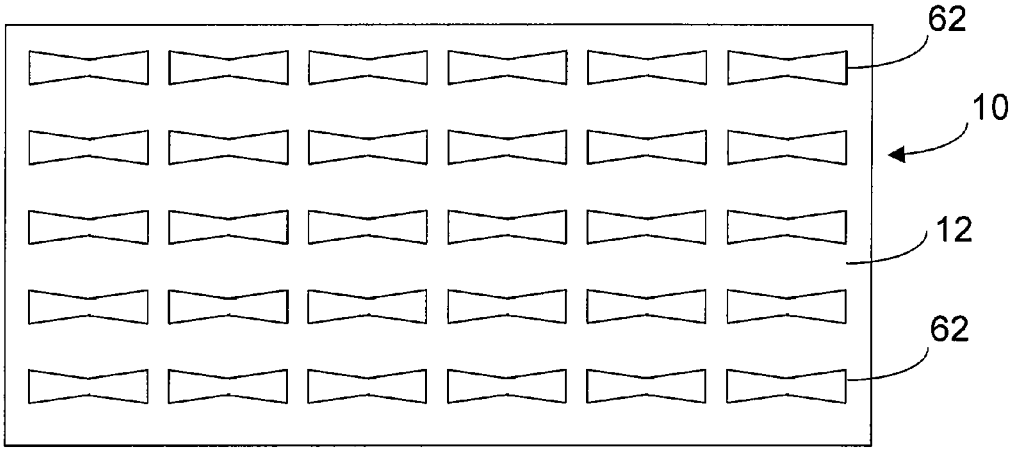
FIG. 6 is a top view of a variable emissivity material as disclosed herein showing an array of resonant apertures in the shape of bow ties on the first metal layer in accordance with the present disclosure.
Figure 7:
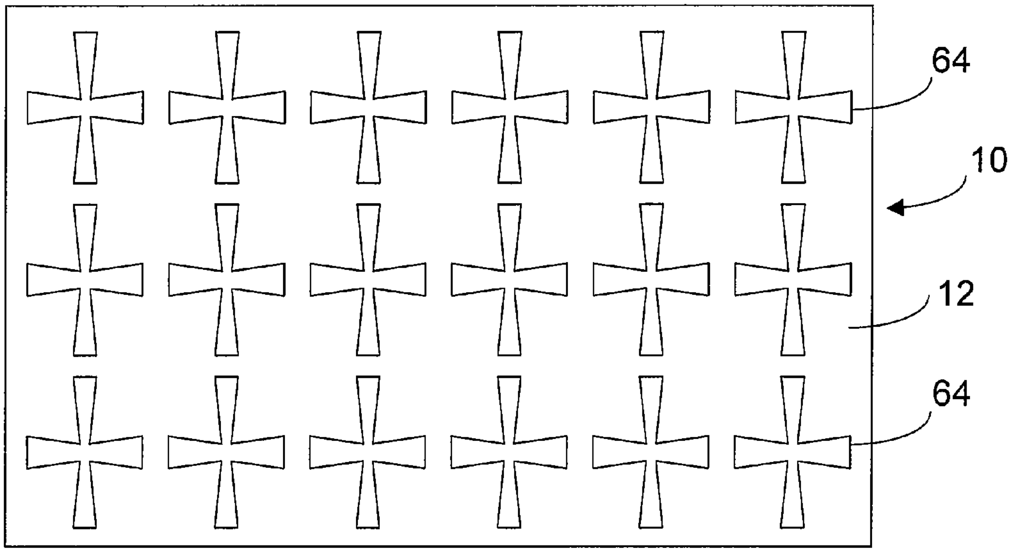
FIG. 7 is a top view of a variable emissivity material as disclosed herein showing an array of resonant apertures in the shape of bow tie crosses on the first metal layer in accordance with the present disclosure.

Another shape of aperture is shown in FIG. 6, which has apertures in the shape of bowties 62. This shape is also polarization dependent, but results in a variable emissivity material 10 that operates over a wider range of wavelengths, than the rectangular apertures of FIG. 4. Yet another shape of aperture is shown in FIG. 7, which has apertures in the shape of bowtie crosses 64. This shape of aperture is polarization independent and also operates over a wider range of wavelengths than the cross apertures of FIG. 5.

The pitch of the periodically spaced apertures or the spacing between the midpoints of adjacent apertures can vary; however, for infrared applications the pitch of the apertures is typically in the range of about 5 to 20 microns.

Figure 8:
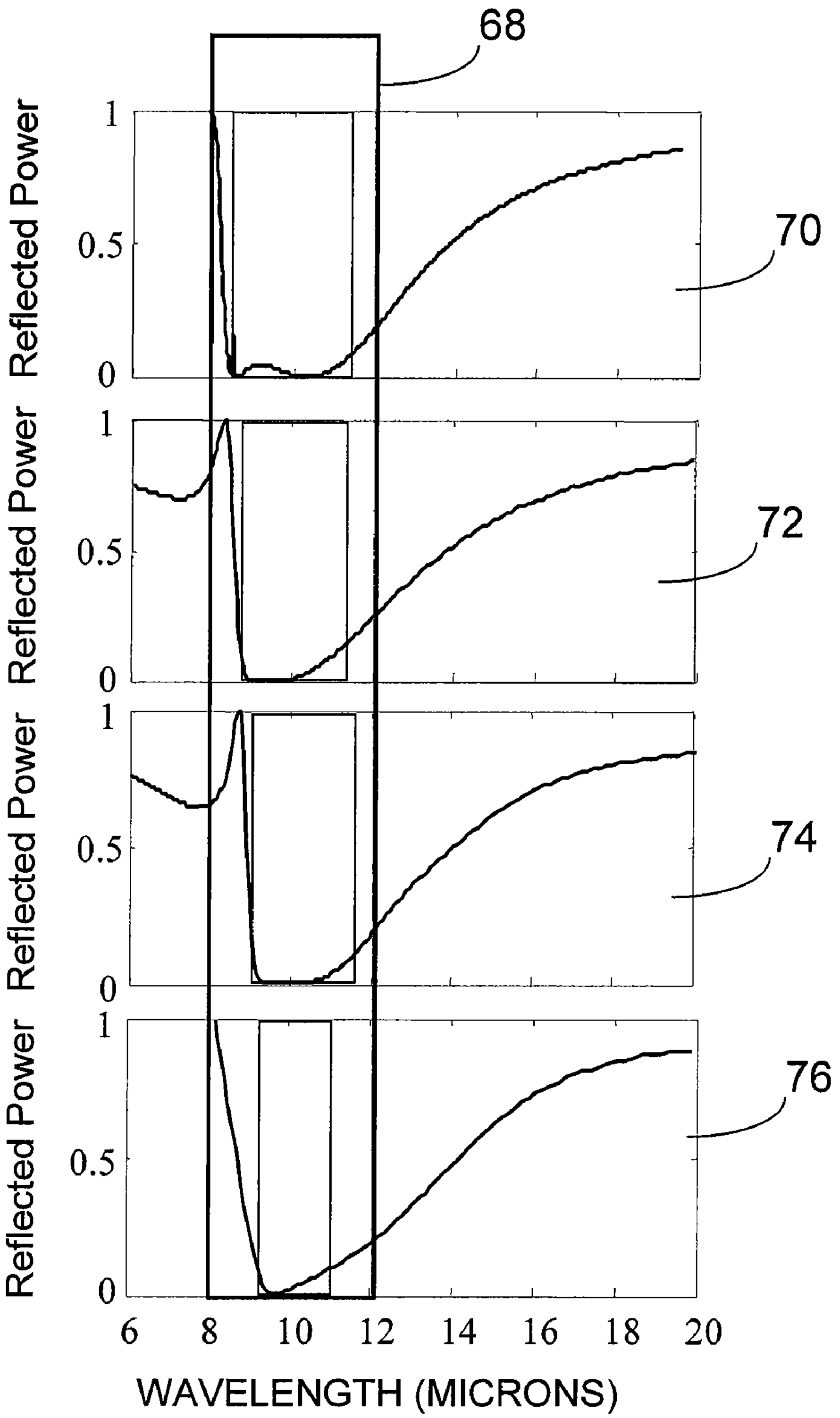
FIG. 8 is a graph showing the bandwidth of the reflected power of a variable emissivity material as disclosed herein in a deactivated state as a function of the relative permittivity of the first dielectric layer, second dielectric layer, and third dielectric layer as disclosed herein in accordance with the present disclosure.

FIG. 8 shows how the emissivity of the variable emissivity material 10 in the deactivated state depends on the properties of the dielectric used for first dielectric layer 22, second dielectric layer 24 and third dielectric layer 26. In general, the first, second and third dielectric layers 22, 24, and 26 each have low loss, low permittivity properties in the infrared bands. The lower the permittivity of these layers, the wider the operational wavelength range of the variable emissivity material 10 and the flatter the absorption characteristics, corresponding to a relatively high emissivity in the deactivated state, across the operational wavelength range. Ideally dielectric layers 22, 24 and 26 each have a relative permittivity of 1.0 as shown in graph 70 of FIG. 8, which provides a very flat absorptive deactivated state across the 8-12 microns infrared bandwidths 68. It is difficult to produce such a material in the infrared spectra. However, practically realizable materials with a permittivity of about 3 produce a very flat response from 9-11 microns wavelength, as shown in graph 72 of FIG. 8. Graphs 74 and 76 show the responses for relative permittivities of 5 and 7, respectively.

The variable emissivity material 10 can be laminated on a surface and thereby change the emissivity of the surface. Applications include military applications. In one nonlimiting example, the variable emissivity material 10 can be laminated onto a surface such as the skin of a missile or an airplane, which would allow the effective emissivity of the missile or airplane to be varied. Thus at one time the variable emissivity material 10 can be caused to have a high emissivity, which would give the missile or airplane a high emissivity and thus reduce the reflection of incident radiation from the missile or airplane. At another time the variable emissivity material 10 can be caused to have a low emissivity, which would give the missile or airplane a low emissivity and thus increase the reflection of incident radiation from the missile or airplane. This might create confusion to a sensor that is trying to track such an object.

Commercial applications may include applications where it is desirable to vary the emissivity of a surface. Thus at one time the variable emissivity material 10 laminated on the surface can be caused to have a high emissivity and the surface would absorb more radiation and thus, as a nonlimiting example, be warmer. At another time the variable emissivity material 10 can be caused to have a low emissivity and the surface would reflect more radiation, and thus, as a nonlimiting example, be cooler.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . . "

What is claimed is:

1. A variable emissivity material comprising:

a first metallic layer having a first aperture;

a second metallic layer having a second aperture;

a variable dielectric layer interposed between the first metallic layer and the second metallic layer, wherein the variable dielectric layer has a variable permittivity;

a first dielectric layer interposed between the first metallic layer and the variable dielectric layer;

a second dielectric layer interposed between the second metallic layer and the variable dielectric layer;

a third metallic layer; and a third dielectric layer interposed between the third metallic layer and the second metallic layer;

wherein in an activated state the variable dielectric layer has a high permittivity compared to the first and second dielectric layers.

2. The material of claim 1 wherein the first and second apertures are rectangular.

3. The material of claim 1 wherein the first and second apertures are shaped as crosses.

4. The material of claim 1 wherein the first and second apertures are shaped as bow tie apertures.

5. The material of claim 1 wherein the first and second apertures are shaped as crossed bow ties.

6. The material of claim 1 wherein the variable dielectric layer is a ferroelectric material.

7. The material of claim 6 wherein the variable dielectric layer is vanadium oxide.

8. The material of claim 1 wherein:

the first metallic layer has a first array of periodically spaced apertures, wherein a pitch between the apertures is in the range of about 5 to 20 microns;

the second metallic layer has a second array of periodically spaced apertures, wherein a pitch between the apertures is in the range of about 5 to 20 microns;

the variable dielectric layer is vanadium oxide; and the first, second and third dielectric layers have a low permittivity in the infrared band.

9. The material of claim 8 wherein the first and second metallic layers are each about 400 nm thick, the variable dielectric is about 100 nm thick, the first and second dielectric layers are each about 200 nm thick, and the third dielectric layer is about 400 nm thick.

10. The material of claim 9 wherein:

the first and second apertures are identical; and the first array of periodic apertures is substantially aligned with the second array of periodic apertures.

11. The material of claim 1 wherein:

the first aperture and the second aperture are identical; and the first aperture is substantially aligned with the second aperture.

12. The material of claim 1 wherein the permittivity of the variable dielectric layer is varied by applying a voltage between the first metallic layer and the second metallic layer.

13. The material of claim 12 wherein the voltage is in the range of about 5 to 100 volts.

14. The material of claim 1 wherein the permittivity of the variable dielectric layer is varied by varying a temperature of the variable dielectric layer.

15. The material of claim 14 wherein the temperature variation is in the range of about 50 to 100 degrees centigrade.

16. The material of claim 1 wherein the third metallic layer comprises a ground plane.

17. The material of claim 1 wherein the first aperture and the second aperture are relatively wide compared to wavelengths of 8-12 microns.

18. The material of claim 1 wherein the first aperture and the second aperture are relatively narrow compared to wavelengths of 8-12 microns.

19. The material of claim 1 wherein the first, second and third dielectric layers have a low permittivity in the infrared band.

20. The material of claim 1 wherein the first, second and third dielectric layers have a relative permittivity in the range of 1 to 7.

21. The material of claim 1 wherein the first and second metallic layers are each about 400 nm thick, the variable dielectric is about 100 nm thick, the first and second dielectric layers are each about 200 nm thick, and the third dielectric layer is about 400 nm thick.

* * * * *